United States Patent [19]

Tamura

[11] 4,193,565
[45] Mar. 18, 1980

[54] SEATBELT RETRACTOR

[75] Inventor: Keiichi Tamura, Nagoya, Japan

[73] Assignee: Kabushiki Kaisha Tokai Rika Denki Seisakusho, Aichi, Japan

[21] Appl. No.: 960,596

[22] Filed: Nov. 14, 1978

[30] Foreign Application Priority Data

Nov. 16, 1977 [JP] Japan .......................... 52-154748[U]

[51] Int. Cl.² ...................... A62B 35/02; B65H 75/48
[52] U.S. Cl. ............................ 242/107.4 A; 242/107.6
[58] Field of Search .......................... 242/107, 107.7; 297/388; 280/744–747

[56] References Cited

U.S. PATENT DOCUMENTS

| 3,897,913 | 8/1975 | Hall | 242/107.4 A |
| 3,908,928 | 9/1975 | Okada | 242/107.4 R |
| 3,957,223 | 5/1976 | Colasanti et al. | 242/107.4 R |

Primary Examiner—John M. Jillions
Attorney, Agent, or Firm—Koda and Androlia

[57] ABSTRACT

A seatbelt retractor wherein the wind-out operation of a webbing to be wound up by a take-up shaft is adapted to be locked through the operation of an acceleration sensor in an emergency of a vehicle. Furthermore, the seatbelt retractor comprises a vibration sensor for sensing the vibrations caused to the vehicle and a frictional clutch mechanism to be operated by a vibration sensor for braking the wind-up operation of the webbing.

5 Claims, 3 Drawing Figures

FIG. 1
PRIOR ART
FIG. 2
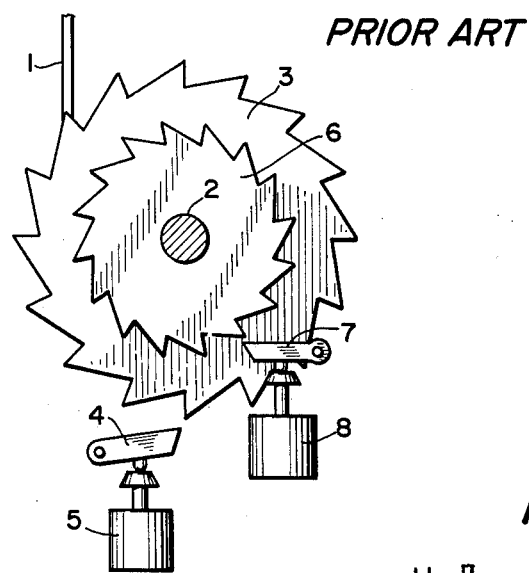
FIG. 3
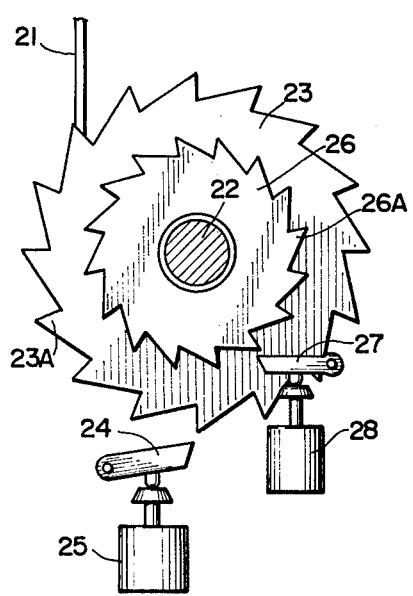
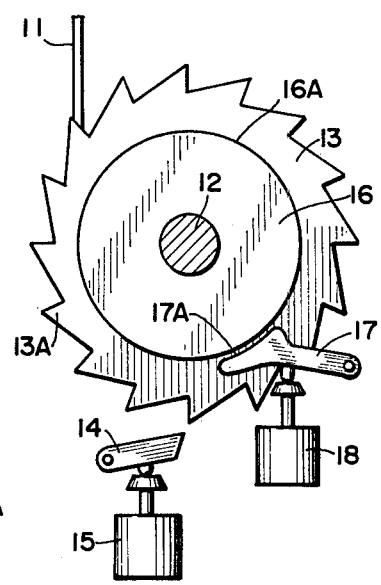

SEATBELT RETRACTOR

BACKGROUND OF THE INVENTION

1. Field of the Invention

The present invention relates to a seatbelt retractor of a vehicle, and particularly, to a seatbelt retractor capable of safely and reliably operating during running on the bad road and the like causing vibrations to the vehicle.

2. Prior Art

The conventional seatbelt retractors have been constructed such that an acceleration sensor senses an acceleration suddenly caused to the vehicle so as to lock the wound-out operation of the webbing restraining and protecting an occupant of the vehicle. With the conventional seatbelt retractor as described above, there has been such a drawback that, during running of the vehicle on a bad road, the webbing is wound up and locked by the vibrations, and eventually, binds up the occupant.

Now, as another type of the conventional seatbelts retractor, such a seatbelt retractor has been proposed that a vibration sensor is provided in addition to the acceleration sensor, and the wound-up operation of the webbing is locked when the vibrations are caused to the vehicle. Namely, as shown in FIG. 1, a webbing 1 is wound up by a take-up shaft 2, and a first ratchet gear wheel 3 is coaxially fixed in the take-up shaft 2. A first pawl 4 is rotatably supported by a frame at a position adjacent to the ratchet gears of the first ratchet gear wheel 3, and the first pawl 4 is engaged with the first ratchet gear wheel 3 by the operation of an acceleration sensor 5, to thereby lock the wind-out operation of the webbing 1 in an emergency of the vehicle. Furthermore, coaxially fixed on the take-up shaft 2 is a second ratchet gear wheel 6, and a second pawl 7 engageable with the ratchet gears of the second ratchet gear wheel 6 is rotatably supported by the frame. The second pawl 7 engages the second ratchet gear wheel 6 by the operation of the vibration sensor 8 to lock the wind-up operation of the webbing 1 in the case of unusual vibrations caused to the vehicle.

However, with the conventional seatbelt retractor provided thereon with the acceleration sensor 5 and the vibration sensor 8 as described above, there has been such a danger that the vibration sensor 8 operates simultaneously with the acceleration sensor 5 to thereby make it unable to wind out and wind up the webbing. Additionally, there has been such a shortcoming that, in order to prevent the danger described above, the positional relationship between the ratchet gears provided on the first ratchet gear wheel 3 and the second ratchet gear wheel 6 should be restricted.

SUMMARY OF THE INVENTION

Accordingly, it is the general object of the present invention to provide a seatbelt retractor wherein the condition of making it unable either to wind out or wind up the webbing is eliminated so that the occupant can be always restrained safely and reliably while the vehicle is being vibrated.

In keeping with the principles of the present invention, the object is accomplished by a unique seatbelt retractor including a vibration sensor for sensing the vibrations caused to the vehicle; and a frictional clutch mechanism operated by said vibration sensor to brake the wind-up operation of a webbing.

BRIEF DESCRIPTION OF THE DRAWINGS

The above-mentioned features and objects of the present invention will become more apparent with reference to the following description, taken in conjunction with the accompanying drawings, wherein like-referenced numerals denote like elements, and in which:

FIG. 1 is a side view showing one embodiment of the conventional seatbelt retractor;

FIG. 2 is a side view showing a first embodiment of the seatbelt retractor according to the present invention; and FIG. 3 is a side view showing a second embodiment of the present invention.

DETAILED DESCRIPTION OF THE INVENTION

Referring more particularly to the drawings, shown in FIG. 2 is an explanatory view showing a first embodiment of the seatbelt retractor according to the present invention, in which a webbing 11 is installed on a take-up shaft 12. Solidly secured to the take-up shaft 12 is a ratchet gear wheel 13 provided at the outer periphery thereof with ratchet teeth 13A. A pawl 14 is rotatably supported by a frame outwardly of the ratchet gear wheel 13. The pawl 14 is rotated by an acceleration sensor 15 in the counterclockwise direction about a fulcrum, engages the ratchet teeth 13A of the ratchet gear wheel 13, and stops the rotation of the webbing 11 of the take-up shaft 12 from being rotated in the wind-out direction. Additionally, a clutch disk 16 is coaxially fixed on the take-up shaft 12. A clutch lever 17 is rotatably supported by the frame outwardly of the clutch disk 16, and a working surface 17A of said clutch lever 17 is relatively confronted by a clutch surface 16A formed by the outer peripheral surface of the clutch disk 16. The clutch lever 17 is rotated by the operation of a vibration sensor 18 in the clockwise direction, engages the working surface 17A thereof with the clutch surface 16A when the vibrations are caused to the vehicle, to thereby brake the rotation of the webbing 11 of the take-up shaft 12 in the wind-up direction.

Description will hereunder be given of the operation of the seatbelt retractor of the above embodiment. At the time when the acceleration sensor 15 operates, the pawl 14 rotates in the counterclockwise direction, engages the ratchet teeth 13A of the ratchet gear wheel 13 to prevent the take-up shaft 12 from being rotated in the clockwise direction, thereby locking the wind-out operation of the webbing 11.

Furthermore, at the time when the vibration sensor 18 operates, the clutch lever 17 is rotated in the clockwise direction, engages the clutch 16, brakes the rotation of the take-up shaft 12 in the counterclockwise direction to lock the wind-up condition of the webbing 11. In the case that, due to the action of said vibration sensor 18, the wind-up operation of the webbing 11 is stopped and the slack of the webbing 11 for the occupant becomes large, if a wind-out force is applied to the webbing 11 so as to make the contact pressure force between the clutch lever 17 and the clutch disk 16 to be zero (0) in said seatbelt retractor, then the clutch lever 17 is disengaged from the clutch disk 16 so that excessive slack will not be applied to the webbing 11.

Furthermore, in the case that both the acceleration sensor 15 and the vibration sensor 18 operate at the same time and both the wind-out and wind-up operations of the webbing 11 are locked, the clutch lever 17 is disengaged from the clutch disk 16 under a wind-up load condition lower than a certain extent, and consequently, the webbing 11 will not be left in a condition where both the wind-out and wind-up operations are prevented.

FIG. 3 is an explanatory view showing a second embodiment of the seatbelt retractor according to the present invention, in which a webbing 21 is installed on a take-up shaft 22. Solidly secured to the take-up shaft 22 is a ratchet gear wheel 23 which is provided at the outer periphery thereof with ratchet teeth 23A. A pawl 24 is provided outwardly of the ratchet gear wheel 23, the pawl 24 is rotated by an acceleration sensor 25 in the counterclockwise direction, engages the ratchet teeth 23A of the ratchet gear wheel 23 to stop the rotation of the take-up shaft 22 in the clockwise direction, locking the wind-out operation of the webbing 21. Further, a clutch disk 26 is in frictional contact with and coaxially supported by the take-up shaft 22, and the clutch disk 26 is provided at the outer periphery thereof with ratchet teeth 26A. A pawl 27 is provided outwardly of the clutch disk 26, the pawl 27 is rotated by the operation of a vibration sensor 28 in the clockwise direction to engage the ratchet teeth 26A, stopping the rotation of the clutch disk 26 in the counterclockwise direction. Due to the stopping of the clutch disk 26, the take-up shaft 22 being in frictional contact with said clutch disk 26 is braked in its rotation in the counterclockwise direction, locking the wind-up condition of the webbing 21.

With the seatbelt retractor of the above embodiment, at the time of the acceleration of operation of the vehicle in an emergency, the wind-out operation of the webbing 21 is locked by the operation of the acceleration sensor 25, and, at the time of the operation of the vibration sensor 28, the wind-up operation of the webbing 21 is braked by the frictional contact between the clutch disk 26 and the take-up shaft 22, and the slack occurred in the webbing 21 is automatically and slowly wound up. Additionally, at the time when both the acceleration sensor 25 and the vibration sensor 28 operate simultaneously, the webbing 21 does not fall in a condition where both the wind-out and wind-up operations are prevented because the clutch disk 26 and the take-up shaft 22 are in frictional contact with each other.

Furthermore, acceleration sensors for sensing the acceleration of the vehicle may be utilized as the vibration sensors 18 and 28 used in the above embodiments.

As has been described above, the seatbelt retractor according to the present invention includes the vibration sensor for sensing the vibrations of the vehicle and the frictional clutch mechanism to be operated by the vibration sensor for braking the wind-up operation of the webbing, and hence, there is presented such an advantage that, even in the vibrating condition of the vehicle, the webbing does not fall into a condition where both the wind-out and wind-up operations are prevented, so that the occupant can be restrained safely and reliably.

It should be apparent to one skilled in the art that the above described embodiments are merely illustrative of but a few of the many possible specific embodiments of the present invention. Numerous and varied other arrangements can be readily devised by those skilled in the art without departing from the spirit and scope of the invention.

What is claimed is:

1. A seatbelt retractor wherein the wind-out operation of a webbing to be wound by a take-up shaft which is locked through the operation of an acceleration sensor in an emergency of a vehicle, characterized in that said retractor comprises a vibration sensor for sensing the vibrations caused to the vehicle and a frictional clutch mechanism to be operated by said vibration sensor for braking the wind-up operation of the webbing.

2. A seatbelt retractor as set forth in claim 1, characterized in that said frictional clutch mechanism comprises a clutch lever to be operated by the vibration sensor and a clutch disk solidly secured to the take-up shaft and in frictional contact with the clutch lever.

3. A seatbelt retractor as set forth in claim 2, characterized in that said clutch lever is formed with a working surface and said working surface is engageable with a clutch surface formed by the outer peripheral surface of the clutch disk.

4. A seatbelt retractor as set forth in claim 1, characterized in that said frictional clutch mechanism comprises a clutch disk being in frictional contact with and coaxially supported by the webbing take-up shaft and means for engaging the clutch disk responsive to operation of the vibration sensor.

5. A seatbelt retractor as set forth in claim 4, wherein the means for engaging comprises a pawl rotated by said vibration sensor and characterized in that said clutch disc is provided at the outer periphery thereof with ratchet teeth which are engageable with said pawl when said pawl is rotated by the vibration sensor.

* * * * *